United States Patent
Koremoto et al.

(10) Patent No.: US 9,610,984 B2
(45) Date of Patent: Apr. 4, 2017

(54) VEHICLE BODY SIDE STRUCTURE

(71) Applicant: HONDA MOTOR CO., LTD., Tokyo (JP)

(72) Inventors: Kensuke Koremoto, Wako (JP); Akira Ishikawa, Wako (JP); Ken Sahara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/827,537

(22) Filed: Aug. 17, 2015

(65) Prior Publication Data

US 2016/0096560 A1 Apr. 7, 2016

(30) Foreign Application Priority Data

Oct. 6, 2014 (JP) .................................. 2014-205723

(51) Int. Cl.
    *B62D 35/00* (2006.01)
    *B60J 5/04* (2006.01)
    *B62D 25/02* (2006.01)

(52) U.S. Cl.
    CPC .......... *B62D 35/008* (2013.01); *B60J 5/0415* (2013.01); *B62D 35/00* (2013.01); *B62D 25/02* (2013.01)

(58) Field of Classification Search
    CPC ........ B60J 5/0415; B62D 25/02; B62D 35/00; B62D 35/007; B62D 35/008
    USPC ................... 296/146.5, 146.9, 180.1, 180.2
    See application file for complete search history.

(56) References Cited

U.S. PATENT DOCUMENTS

| | | | |
|---|---|---|---|
| 6,260,911 B1 * | 7/2001 | Becker | B62D 35/005 180/903 |
| 8,007,037 B2 * | 8/2011 | Wolkersdorfer | B60K 11/08 296/193.05 |
| 2016/0144905 A1 * | 5/2016 | Nishiura | B62D 25/02 296/180.1 |

FOREIGN PATENT DOCUMENTS

| | | | | |
|---|---|---|---|---|
| DE | 10047731 A1 | * | 4/2002 | ........... B62D 35/008 |
| DE | 102008043470 A1 | * | 5/2010 | ............. B62D 35/00 |
| FR | 2858797 A1 | * | 2/2005 | ........... B62D 35/005 |
| JP | 61-6478 U | | 1/1986 | |
| JP | 2004-338602 A | | 12/2004 | |
| JP | 2014 076728 A | * | 5/2014 | ............. B62D 37/02 |

OTHER PUBLICATIONS

English translation of FR 2,858,797; retreived Jul. 27, 2016via PatentTranslate located at www.epo.org.*

(Continued)

*Primary Examiner* — Jason S Daniels
(74) *Attorney, Agent, or Firm* — Westerman, Hattori, Daniels & Adrian, LLP (57) ABSTRACT

A vehicle body side structure includes a flow redirecting member that introduces a traveling wind in a direction toward a wheel arch for a rear tire. The flow redirecting member has an inlet portion through which the traveling wind is introduced and an outlet portion through which air having been introduced through the inlet portion is ejected to the wheel arch side. The inlet portion is positioned in front of the wheel arch. The outlet portion has a slit shape extending along a surface of the rear tire on an outer side in a vehicle width direction.

10 Claims, 9 Drawing Sheets

(56) References Cited

OTHER PUBLICATIONS

English translation of DE 100 47 731; retreived Jul. 27, 2016 via the Japan Platform for Patent Information, located at https://www.j-platpat.inpit.go.jp/web/all/top/BTmTopEnglishPage.*
Office Action dated Aug. 26, 2016, issued in counterpart Japanese application No. 2014-205723.

* cited by examiner

VEHICLE BODY SIDE STRUCTURE

CROSS REFERENCES TO RELATED APPLICATIONS

The present application claims priority under 35 U.S.C. §119 to Japanese Patent Application No. 2014-205723, filed Oct. 6, 2014, entitled "Vehicle Body Side Structure." The contents of this application are incorporated herein by reference in their entirety.

TECHNICAL FIELD

The present disclosure relates to a vehicle body side structure that includes a flow redirecting member.

BACKGROUND

Airflow around a tire is disturbed while the vehicle is traveling. In order to suppress the disturbance of the airflow, some vehicles are provided with flow redirecting members. For example, Japanese Unexamined Patent Application Publication No. 2004-338602 discloses a technique of a flow redirecting member for redirecting airflow around a front tire and a front wheel arch.

A front bumper of a vehicle described in Japanese Unexamined Patent Application Publication No. 2004-338602 has an inlet portion through which a traveling wind is introduced. A front wall portion of the front wheel arch has an outlet portion on the outer side in the vehicle width direction. The traveling wind having been introduced through the inlet portion is ejected through the outlet portion. The inlet portion and the outlet portion are connected to each other through a duct.

While the vehicle is traveling, the traveling wind striking the front bumper is introduced through the inlet portion. The traveling wind passes through the duct, is ejected through the outlet portion, and passes near an edge of a side surface part of the front tire. The airflow around the front tire is redirected by the ejected traveling wind.

Usually, a space is provided between the front bumper and the front wheel arch. In this case, the flow redirecting member is easily arranged. In contrast, since a vehicle cabin is formed in front of the rear tire, it is difficult to arrange the flow redirecting member in front of the rear tire. However, when the vehicle is traveling, the airflow is also disturbed around a rear wheel arch and the rear tire. Thus, it is desirable to redirect the disturbed airflow.

SUMMARY

For example, the present application describes a vehicle body side structure that includes a flow redirecting member that can redirect airflow around the rear wheel arch and a rear tire.

According to an aspect of the present disclosure, a vehicle body side structure includes a flow redirecting member that introduces a traveling wind in a direction toward a wheel arch for a rear tire. The flow redirecting member has an inlet portion through which the traveling wind is introduced and an outlet portion through which air having been introduced through the inlet portion is ejected to the wheel arch side. The inlet portion is positioned in front of the wheel arch. The outlet portion has a slit shape extending along a surface of the rear tire on an outer side in a vehicle width direction.

Thus, when the vehicle is traveling, the traveling wind flowing near the vehicle body side part can be introduced into the wheel arch. Airflow disturbed by rotation of the rear tire or the shape of the wheel arch is redirected and air resistance against the vehicle is reduced. Since the outlet portion is formed on the outer side in the vehicle width direction, the disturbed airflow can be redirected without reducing a living space in a vehicle cabin.

Preferably, the inlet portion is positioned in a panel in a vehicle body side part.

The traveling wind flowing along the panel in the vehicle body side part is guided to the wheel arch while the flow of the traveling wind is not disturbed. As a result, the effect of redirecting the airflow by using the flow redirecting member is improved.

Preferably, the flow redirecting member has a closed sectional shape formed by an inner wall portion disposed on an inner side in the vehicle width direction and an outer wall portion disposed on the outer side in the vehicle width direction. In this case, a front end of the inner wall portion is flush with a surface of the panel.

If the front end of the inner wall portion projects or is recessed relative to the surface of the panel, the airflow is disturbed around the front end of the inner wall portion. In contrast, when the front end of the inner wall portion is flush with the surface of the panel, the traveling wind is smoothly introduced into the inlet portion. Thus, the effect of redirecting the airflow by using the flow redirecting member is further improved.

Preferably, the panel is a door panel, and the outlet portion is formed at a rear end part of the door panel.

In general, a door panel is smaller than a body panel integrated with a vehicle body. When the flow redirecting member is provided in the smaller door panel, the shape of the flow redirecting member can be easily changed in order to tune the aerodynamic performance of the flow redirecting member.

Preferably, part of the wheel arch for the rear tire is formed by the rear end part of the door panel where the outlet portion is formed.

Thus, the outlet portion is positioned just in front of the rear tire. Since the traveling wind ejected through the outlet portion directly flows to a region around the rear tire, the effect of redirecting can be further improved.

Preferably, an upper end of the outer wall portion is flush with a surface of the door panel.

That is, the flow redirecting member is attached such that the flow redirecting member does not project from the door panel. Thus, the traveling wind flowing along the door panel can be introduced and redirected without increasing the vehicle width.

BRIEF DESCRIPTION OF THE DRAWINGS

The advantages of the disclosure will become apparent in the following description taken in conjunction with the following drawings.

DETAILED DESCRIPTION

An embodiment of the present disclosure will be described below with reference to the accompanying drawings. In the following description, the left and the right refer to the left and the right with respect to an occupant of a vehicle, and the front and the rear refer to the front and the rear with respect to a traveling direction of the vehicle. Furthermore, "Fr" and "Rr" respectively indicate the front and the rear, "L" and "R" respectively indicate the left and the right when seen from the occupant, and "Up" and "Dn" respectively indicate upper and lower directions or sides.

Embodiment

Figure 1:
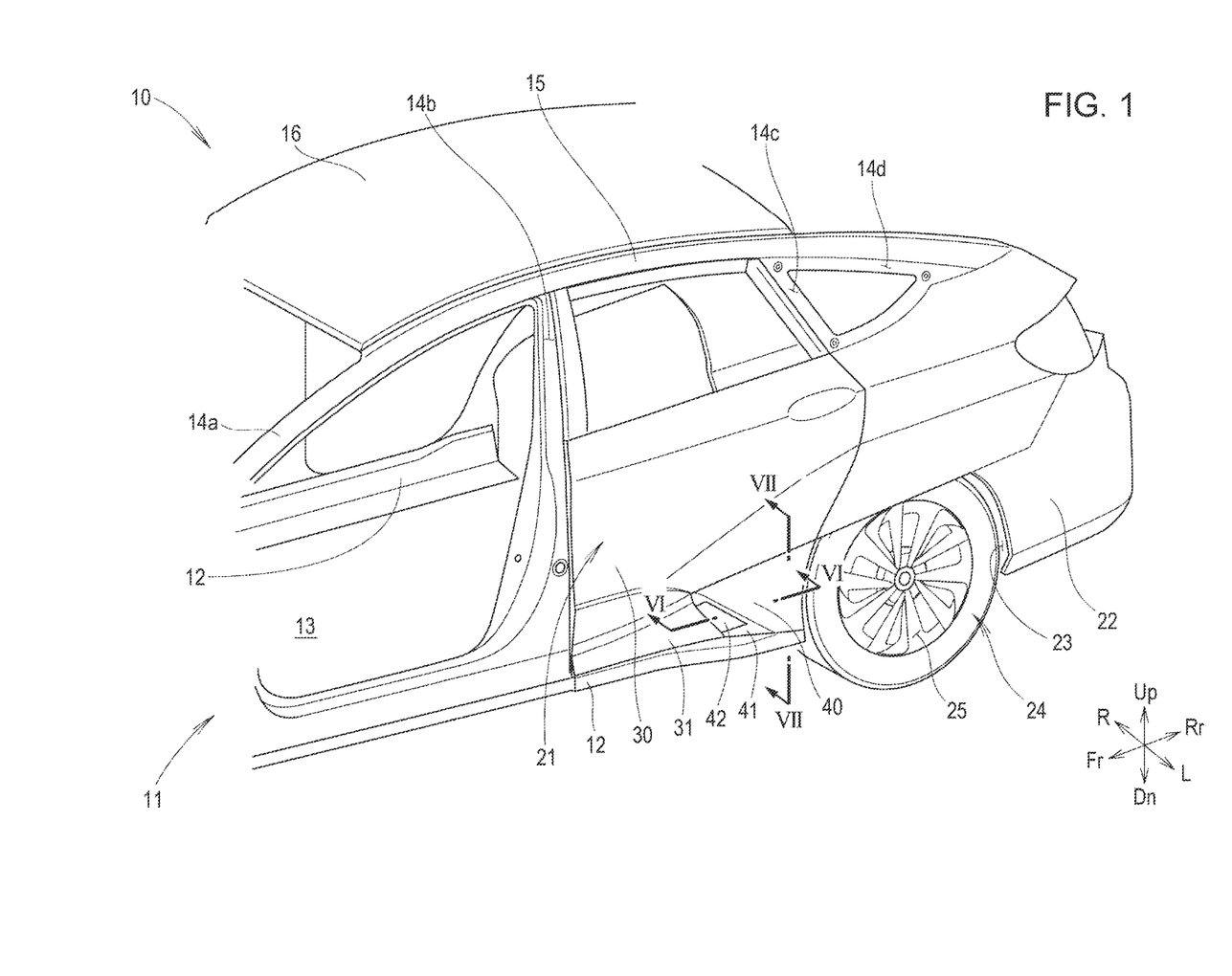
FIG. 1 is a perspective view of a vehicle for which a vehicle body side structure according to an embodiment of the present disclosure is adopted.

FIG. 1 illustrates a vehicle 10 for which vehicle body side structures according to the present disclosure are adopted. The vehicle 10 includes a vehicle body 11 that includes left and right side sills 12, a floor panel 13, pillars 14a to 14d, left and right roof side rails 15, and a roof panel 16. The left and right side sills 12 extend in the front-rear direction. The floor panel 13 spans between the left and right side sills 12. Four left pillars 14a to 14d and four right pillars 14a to 14d respectively stand erect on the left and right side sills 12 (only four left pillars 14a to 14d are illustrated in FIG. 1). The left and right roof side rails 15 respectively span between and are coupled to upper ends of four left pillars 14a to 14d and four right pillars 14a to 14d (only the left roof side rail 15 is illustrated in FIG. 1). The roof panel 16 spans between the left and right roof side rails 15.

Four left and four right pillars 14a to 14d are referred to as A-pillars 14a, B-pillars 14b, C-pillars 14c, and D-pillars 14d in this order from the front.

Doors 21 are swingably provided between the B-pillars 14b and the C-pillars 14c. Quarter panels 22 are provided behind the doors 21.

Wheel arches 23 are provided at the lower rear part of the vehicle body 11. Rear tires 24 are disposed such that the rear tires 24 are surrounded by the wheel arches 23.

Flow redirecting members 40 are disposed in front of the rear tires 24. The flow redirecting members 40 each introduce a traveling wind and redirect a flow in a corresponding one of the wheel arches 23 by using the traveling wind having been introduced. Each of the flow redirecting members 40 is integrally attached to an outer panel 30 (door panel 30) of a corresponding one of the doors 21.

The flow redirecting members 40 each have a substantially trapezoidal shape having an upper side and a lower side that is shorter than the upper side in side view of the vehicle body. A rear end part of each of the flow redirecting members 40 is curved forward. Part of a corresponding one of the wheel arches 23 is formed by this curved rear end part.

Further details of the flow redirecting member 40 will be described below with reference to FIG. 2 and the succeeding figures.

Figure 2:
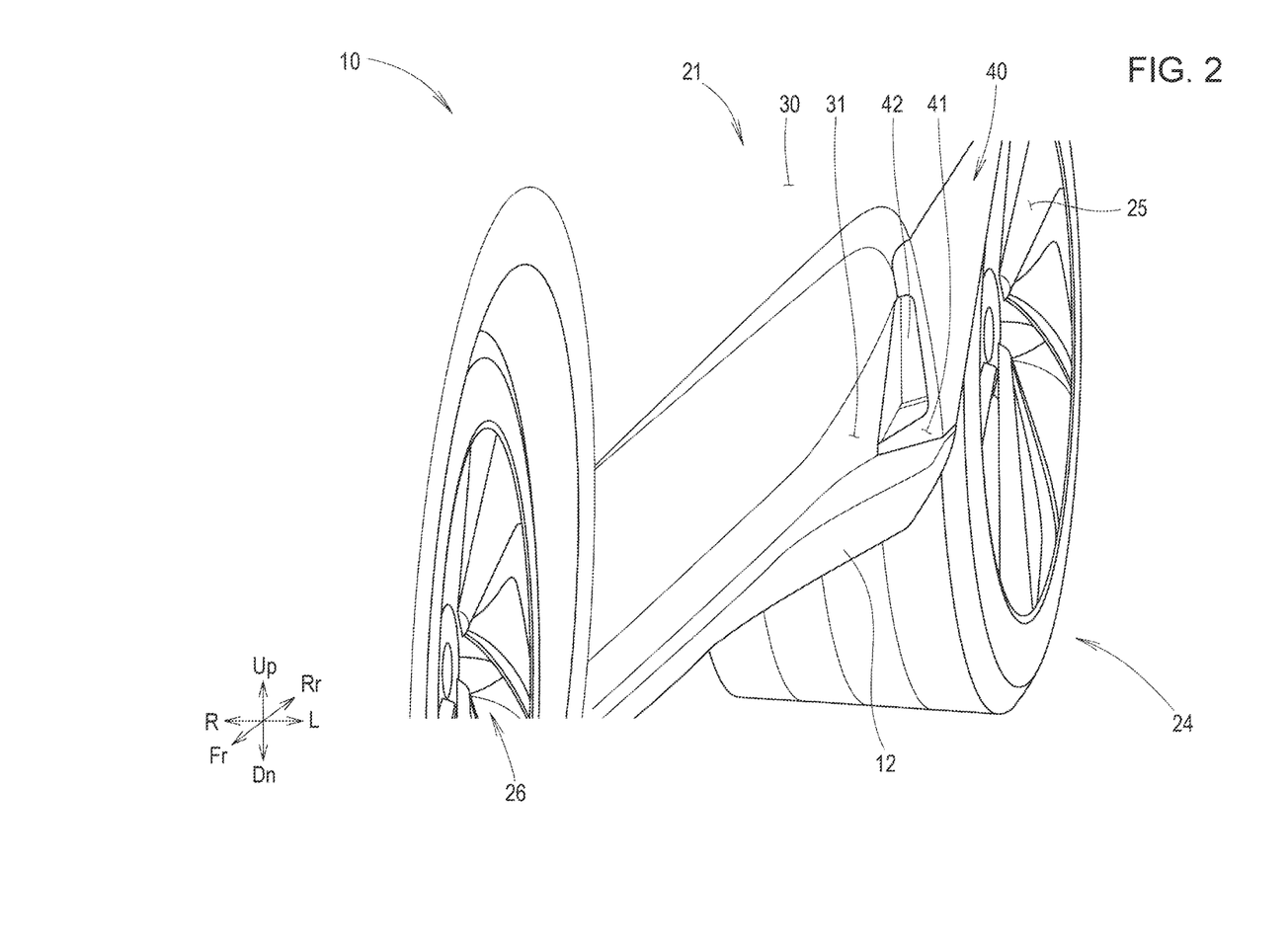
FIG. 2 is a perspective view of a flow redirecting member attached to a door panel illustrated in FIG. 1 showing the front side.

Referring to FIG. 2, a recess portion 31 is formed at the lower part of the outer panel 30 of the door 21 so as to extend in the front-rear direction. The flow redirecting member 40 is located at a rear of the recess portion 31. The flow redirecting member 40 has a front surface portion 41 in which an inlet portion 42, through which a traveling wind is introduced, is formed. The inlet portion 42 has a rectangular shape extending in the up-down direction in front view of the vehicle body.

Figure 3:
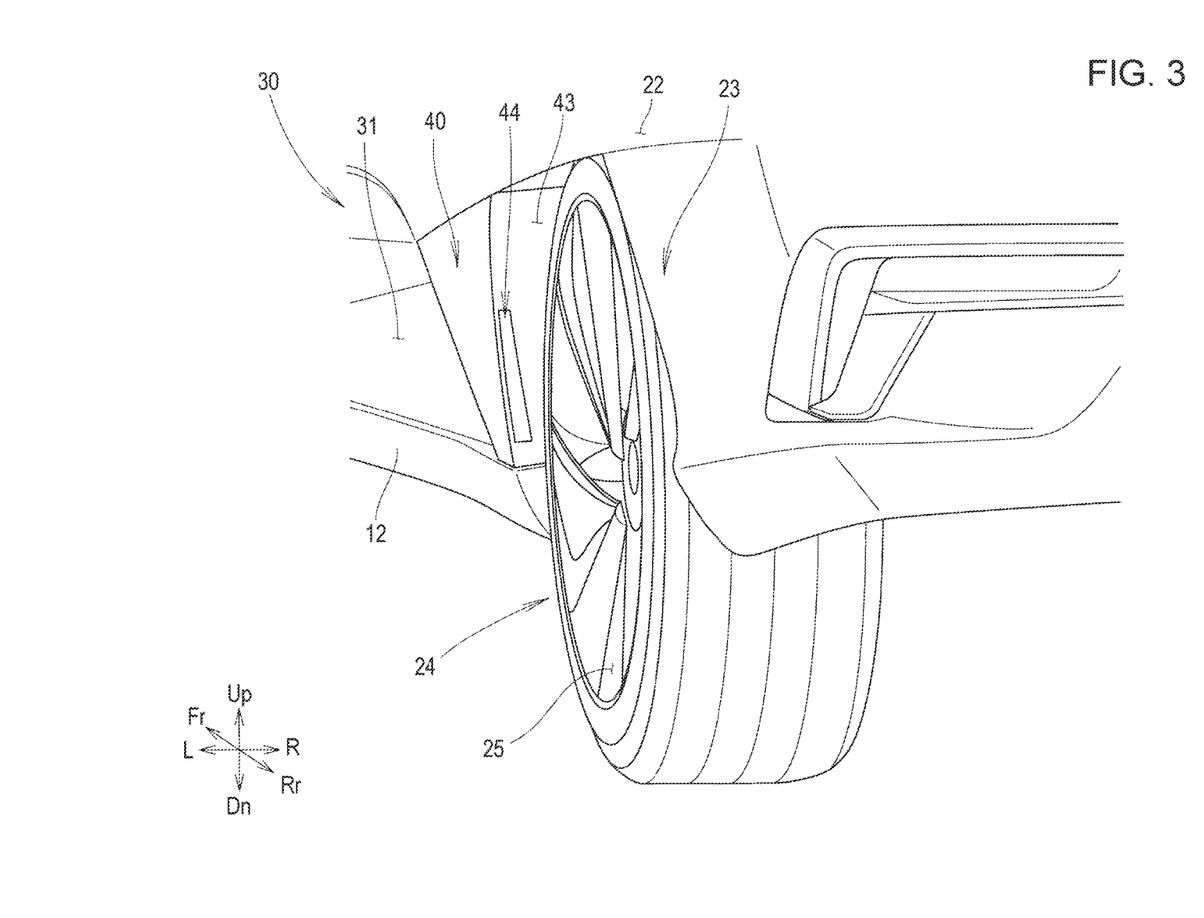
FIG. 3 is a perspective view of the flow redirecting member attached to the door panel illustrated in FIG. 1 showing the rear side.

Referring to FIG. 3, the flow redirecting member 40 has a rear surface portion 43 in which an outlet portion 44 is formed. The air introduced through the inlet portion 42 (see FIG. 2) is ejected toward the wheel arch 23 side through the outlet portion 44. The outlet portion 44 has a slit shape extending along a wheel 25 (surface on the outer side in the vehicle width direction) of the rear tire 24. The length of the outlet portion 44 in the longitudinal direction is about one fourth of the diameter of the rear tire 24. At least part of the outlet portion 44 is coincident with the rotational center of the rear tire 24 in the height direction.

Figure 4A:
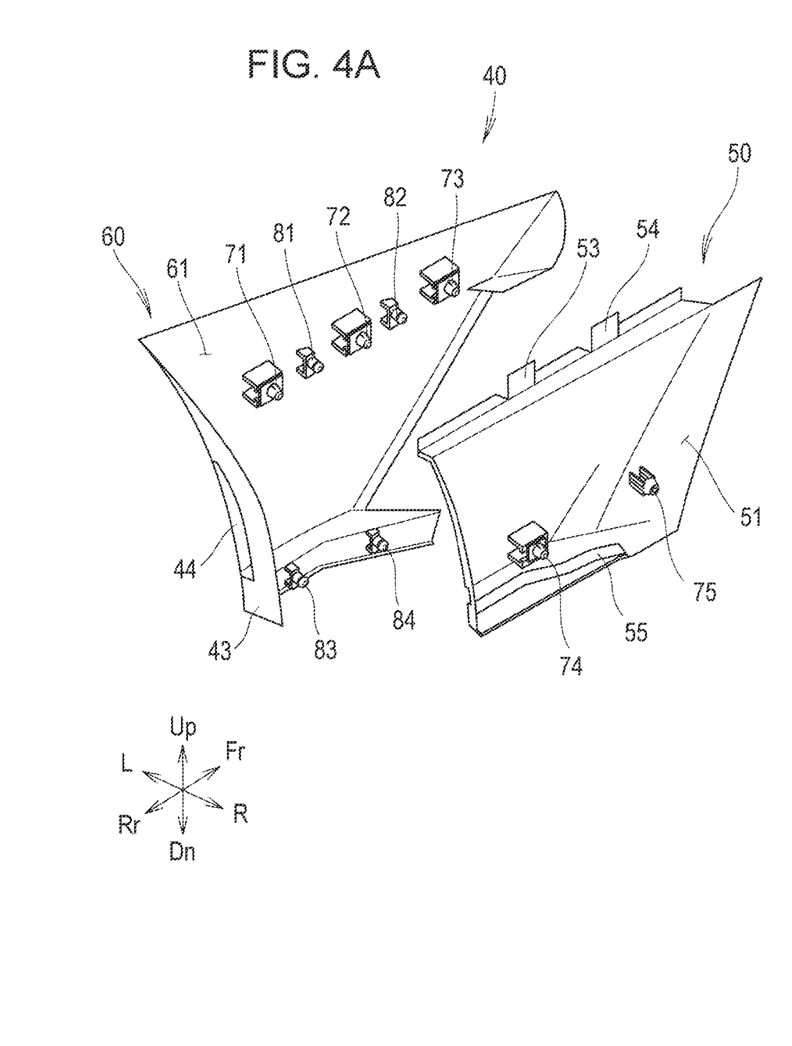
FIGS. 4A and 4B are explanatory views illustrating a method of combining an outer wall portion and an inner wall portion of the flow redirecting member illustrated in FIG. 1 with each other.

Referring to FIG. 4A, the flow redirecting member 40 includes an inner wall portion 50 and an outer wall portion 60. The inner wall portion 50 is located on an inner side in the vehicle width direction, and the outer wall portion 60 is located on an outer side in the vehicle width direction.

First to third attachment portions 71 to 73 are provided along an upper end of a rear surface of the outer wall portion 60 (referred to as an outer wall rear surface portion 61 hereafter). The first to third attachment portions 71 to 73 are used to attach the flow redirecting member 40 to the outer panel 30 (see FIG. 3). Tip ends of the first to third attachment portions 71 to 73 each have a frustoconical shape.

A first securing portion 81 used to secure the outer wall portion 60 and the inner wall portion 50 to each other is provided between the first attachment portion 71 and the second attachment portion 72 on the outer wall rear surface portion 61. Likewise, a second securing portion 82 is provided between the second attachment portion 72 and the third attachment portion 73. A third securing portion 83 and a fourth securing portion 84 are provided at the lower part of the outer wall rear surface portion 61.

A fourth attachment portion 74 and a fifth attachment portion 75 are provided at the lower part of a rear surface of the inner wall portion 50 (referred to as an inner wall rear surface portion 51 hereafter). The fourth attachment portion 74 and the fifth attachment portion 75 are used to attach the flow redirecting member 40 to the outer panel 30. Tip ends of the fourth attachment portion 74 and fifth attachment portion 75 each have a frustoconical shape.

A first flat plate 53 and a second flat plate 54 that extend upward are formed at an upper end of the inner wall portion 50. A projection 55 that projects outward in the vehicle width direction is formed at a lower end of the inner wall portion 50.

Figure 4B:
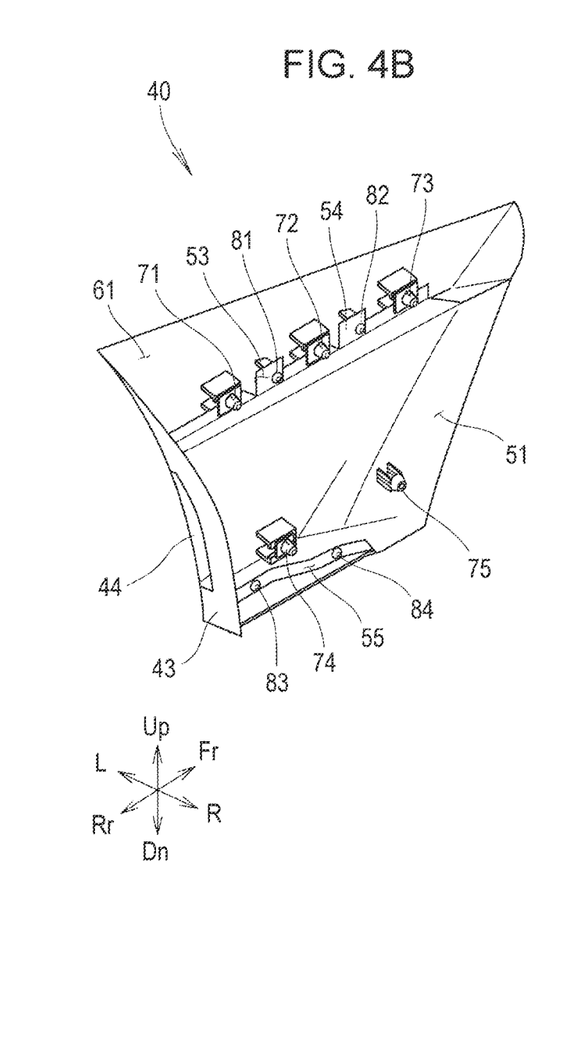

Referring to FIG. 4B, when the outer wall portion 60 and the inner wall portion 50 are superposed on each other, the first flat plate 53 and second flat plate 54 are respectively superposed on the first securing portion 81 and the second securing portion 82. The projection 55 is superposed on the third securing portion 83 and the fourth securing portion 84. The first flat plate 53, the second flat plate 54, and the projection 55 are respectively secured to the first to fourth securing portions 81 to 84. Thus, the outer wall portion 60 and the inner wall portion 50 are secured to each other. The flow redirecting member 40 has a closed sectional shape.

Figure 5A:
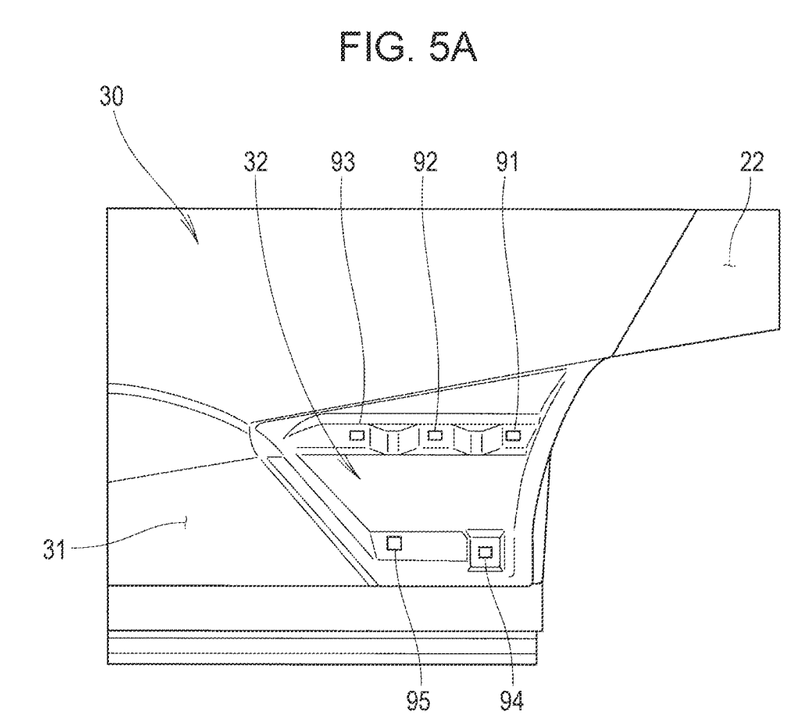
FIGS. 5A and 5B are explanatory views illustrating a method of attaching the flow redirecting member to the door panel.
Figure 5B:
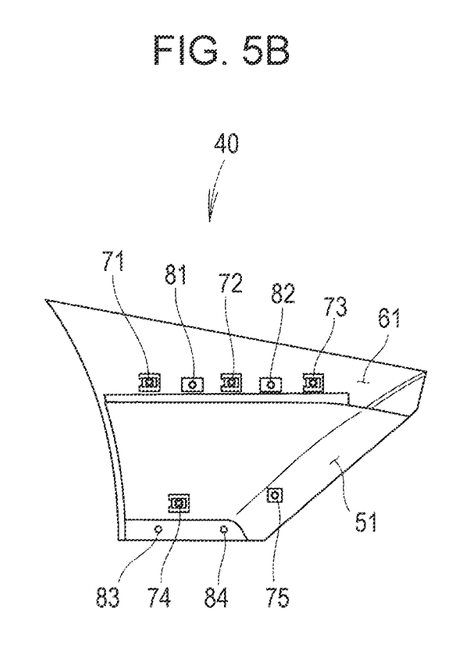

Referring to FIGS. 5A and 5B, a receiving portion 32 is formed at the rear lower part of a surface of the outer panel 30 by press forming so that the flow redirecting member 40 is combined with the outer panel 30. Rectangular first to third attachment holes 91 to 93 are formed at the upper part of the receiving portion 32. Rectangular fourth and fifth attachment holes 94 to 95 are formed at the lower part of the receiving portion 32.

The flow redirecting member 40 is superposed on a surface of the receiving portion 32, so that the first attachment portion 71 is inserted into the first attachment hole 91. Likewise, the second to fourth attachment portions 72 to 74 are respectively inserted into the second to fourth attachment holes 92 to 94. Thus, the flow redirecting member 40 is attached to the outer panel 30.

Figure 6:
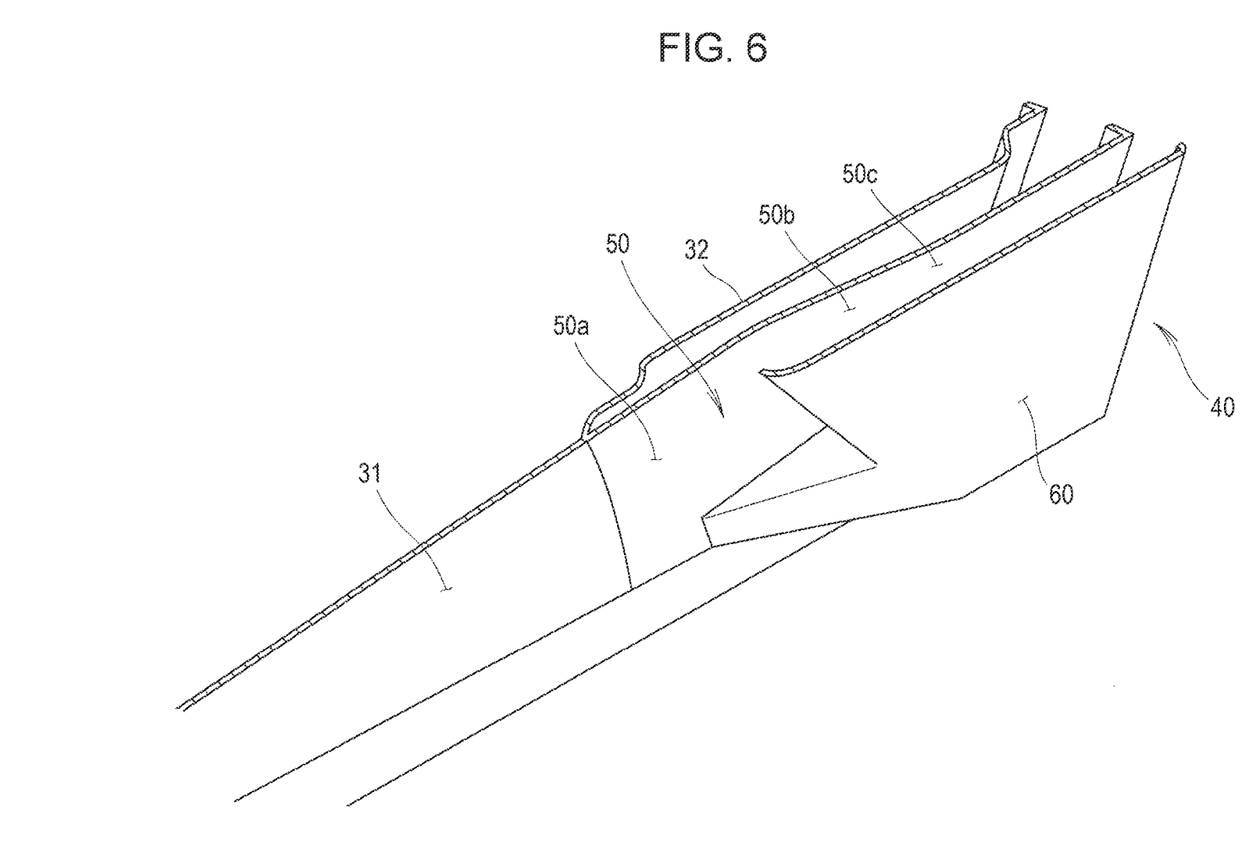
FIG. 6 is a sectional view taken along line VI-VI in FIG. 1.

FIG. 6 illustrates the section of the flow redirecting member 40 attached to the outer panel 30 taken in the front-rear direction. A front portion 50a (front end) of the inner wall portion 50 of the flow redirecting member 40 is continuous with a surface of the recess portion 31 formed in the outer panel 30. That is, the front portion 50a of the inner wall portion 50 is flush with the surface of the recess portion 31. A region of the inner wall portion 50 from a central portion 50b to a rear portion 50c bulges outward more in the vehicle width direction than the front portion 50a.

Figure 7:
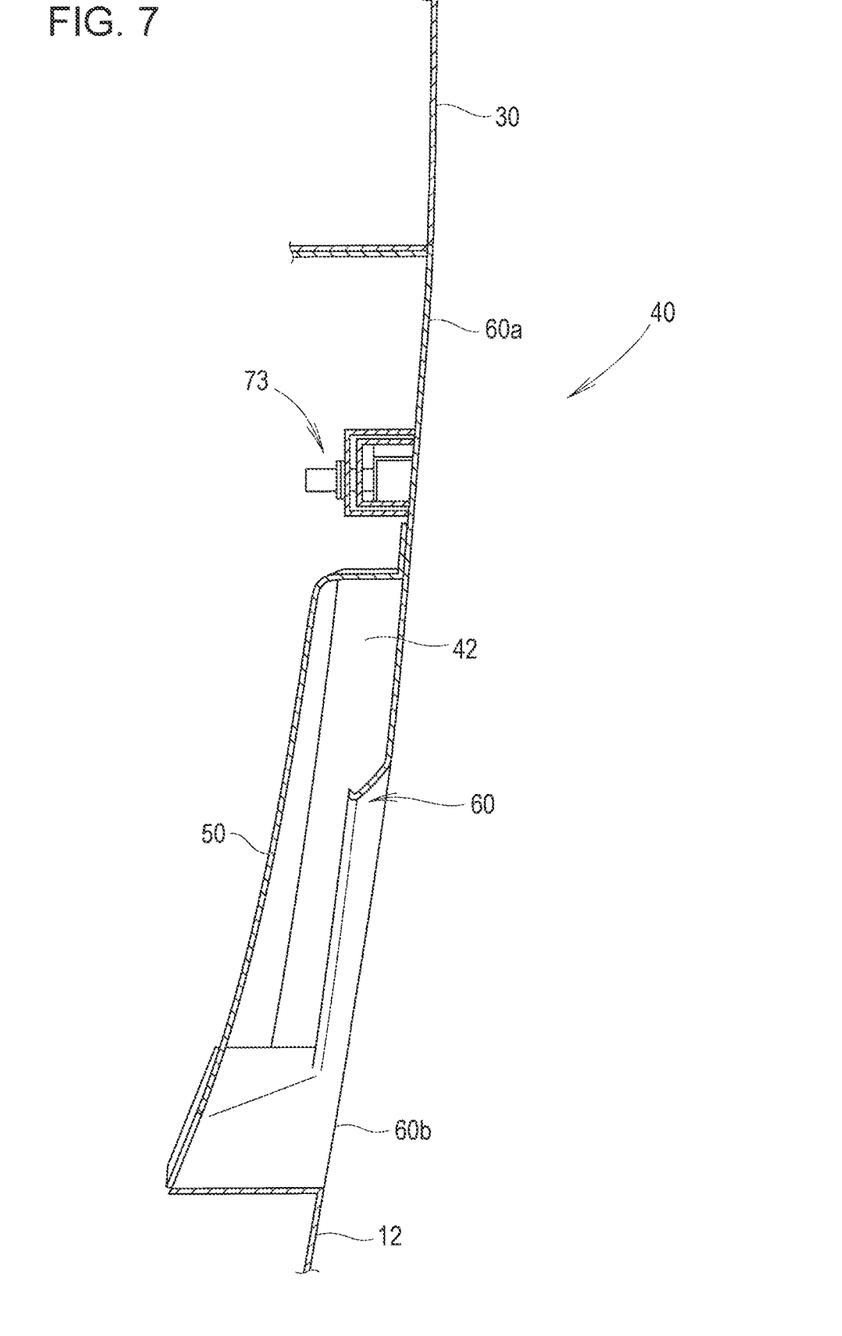
FIG. 7 is a sectional view taken along line VII-VII in FIG. 1.

FIG. 7 illustrates the section of the flow redirecting member 40 attached to the outer panel 30 in the up-down direction. An upper end 60a of the outer wall portion 60 of the flow redirecting member 40 is continuous with a surface of the outer panel 30. That is, the upper end 60a of the outer wall portion 60 is flush with the surface of the outer panel 30. Likewise, a lower end 60b of the outer wall portion 60 of the flow redirecting member 40 is flush with a surface of the side sill 12.

Next, action and effects of the present disclosure will be described.

Figure 8:
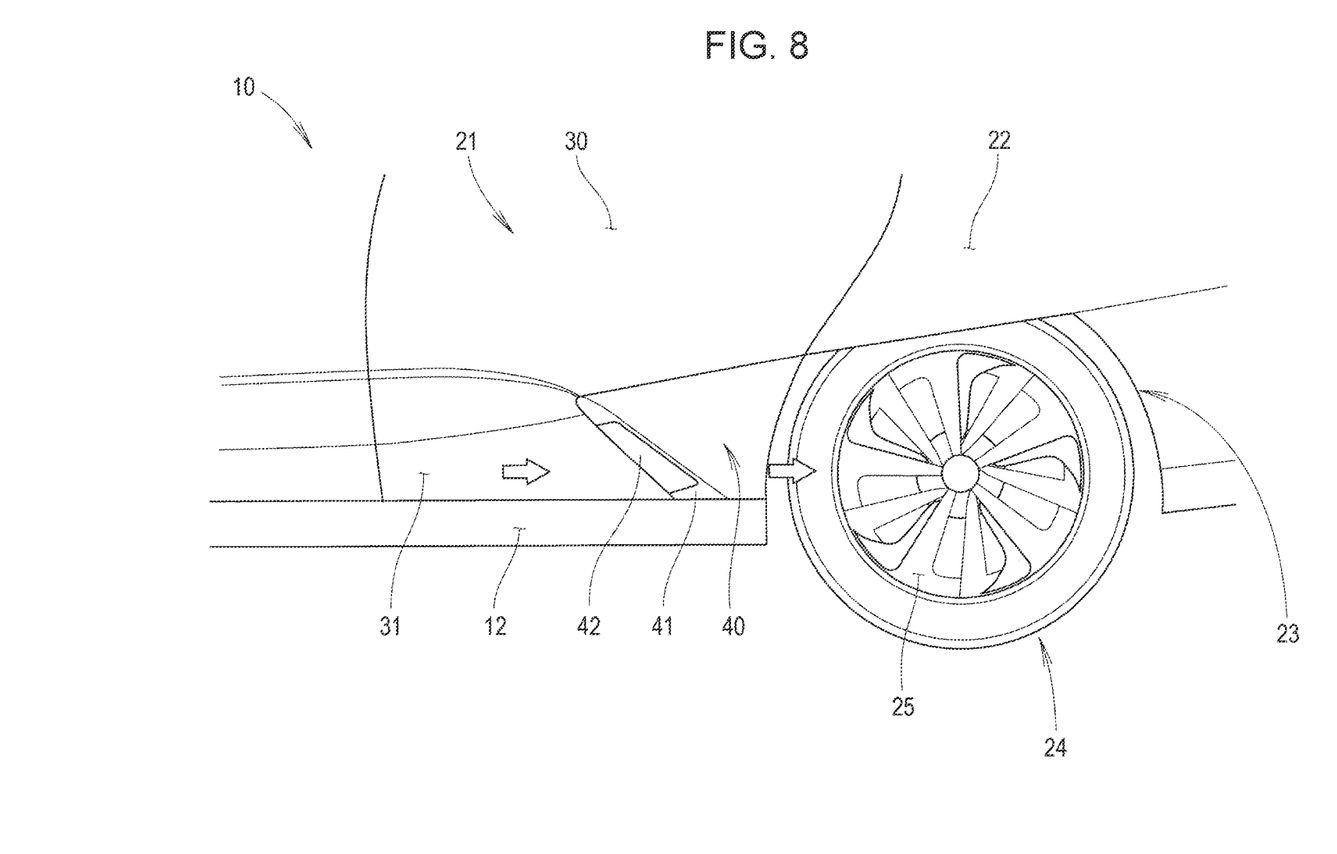
FIG. 8 is a side view of a vehicle body illustrated in FIG. 1.
Figure 9:
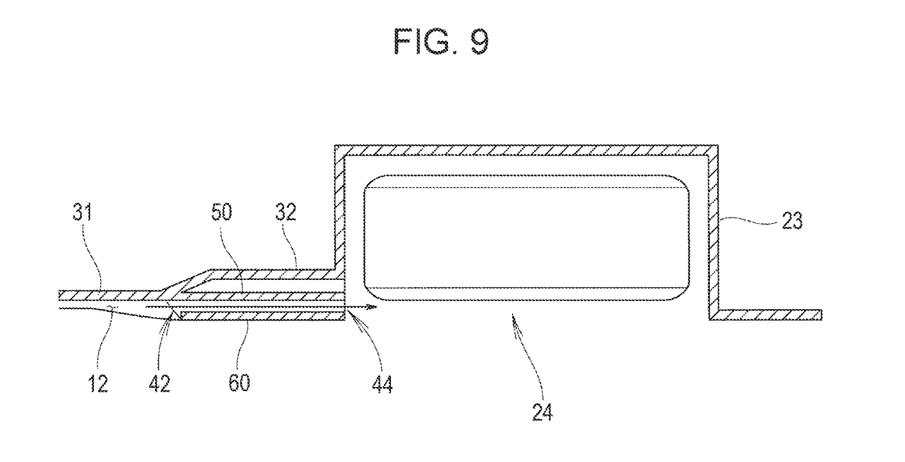
FIG. 9 illustrates action of the vehicle body illustrated in FIG. 1.

Referring to FIG. 3, the outlet portion 44 has a slit shape extending along the wheel 25 of the rear tire 24. Thus, as illustrated in FIGS. 8 and 9, when the vehicle 10 is traveling, a traveling wind flowing near the outer panel 30 of the door 21 can be introduced to the wheel arch 23. Airflow disturbed by rotation of the rear tire 24 or the shape of the wheel arch 23 is redirected and air resistance against the vehicle 10 is reduced. Since the outlet portion 44 is formed on the outer side in the vehicle width direction, the disturbed airflow can be redirected without reducing a living space in a vehicle cabin.

Furthermore, since a rear end part of the outer panel 30 of the door 21 where the outlet portion 44 is formed is part of the rear wheel arch 23, the outlet portion 44 is positioned just in front of the rear tire 24. Since the traveling wind ejected through the outlet portion 44 directly flows toward a region around the rear tire 24, the effect of redirecting can be further improved.

Referring to FIG. 2, the inlet portion 42 is positioned in the outer panel 30 of the door 21. The traveling wind flowing along the recess portion 31 of the outer panel 30 is guided to the wheel arch 23 while the flow of the traveling wind is not disturbed. As a result, the effect of redirecting the airflow by using the flow redirecting member 40 is improved.

Referring to FIG. 6, The front portion 50a (front end) of the inner wall portion 50 of the flow redirecting member 40 is flush with the surface of the recess portion 31 formed in the outer panel 30. When the front portion 50a of the inner wall portion 50 is flush with the recess portion 31, the traveling wind is smoothly introduced into the inlet portion 42 without being interrupted. Thus, the effect of redirecting the airflow by using the flow redirecting member 40 is further improved.

Referring to FIGS. 1 and 3, the outlet portion 44 is formed in the rear end part of the outer panel 30. In general, an outer panel of a door is smaller than a body panel integrated with a vehicle body. When the flow redirecting member 40 is provided in the smaller outer panel 30, the shape of the flow redirecting member 40 can be easily changed in order to tune the aerodynamic performance of the flow redirecting member 40.

Referring to FIG. 2, when the flow redirecting member 40 is provided in the outer panel 30, part of the outer panel 30 is covered by the flow redirecting member 40. Thus, the outer panel 30 is protected from chipping caused by, for example, pebbles thrown up by the front tire 26. For example, even when a pebble enters the flow redirecting member 40 through the inlet portion 42 and makes a scratch on the surface of the inner wall portion 50, the inner wall portion 50 is covered by the outer wall portion 60. Thus, the scratch is not visible.

Referring to FIG. 7, the upper end 60a of the outer wall portion 60 of the flow redirecting member 40 is flush with the surface of the outer panel 30. Furthermore, the lower end 60b of the outer wall portion 60 of the flow redirecting member 40 is flush with the surface of the side sill 12. That is, the flow redirecting member 40 is attached such that the flow redirecting member 40 does not project from the outer panel 30. Thus, the traveling wind flowing along the outer panel 30 can be introduced and redirected without increasing the vehicle width.

The flow redirecting member 40 may be provided in any type of the panel as long as the flow redirecting member 40 is positioned in front of the rear tire 24. For example, the flow redirecting member 40 may be provided in a side panel or a side sill depending on the type of the vehicle.

The vehicle body side structure according to the present disclosure is preferable for a passenger vehicle. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle body side structure comprising: a flow redirecting member that introduces a traveling wind in a direction toward a rear wheel arch for a rear tire, wherein the flow redirecting member includes an inlet portion through which the traveling wind is introduced and an outlet portion through which air having been introduced through the inlet portion is ejected to a rear wheel arch side, wherein the inlet portion is positioned in front of the wheel arch, and wherein the outlet portion has a slit shape facing a surface of the rear tire on an outer side in a vehicle width direction, wherein the inlet portion is positioned in a panel in a vehicle body side part, wherein the flow redirecting member has a closed sectional shape formed by an inner wall portion disposed on an inner side in the vehicle width direction and an outer wall portion disposed on the outer side in the vehicle width direction, wherein a front end of the inner wall portion is flush with a surface of the panel, wherein the panel is a door panel, and the outlet portion is disposed at a rear end part of the door panel, and wherein the rear end part of the door panel where the outlet portion is disposed constitutes a part of the rear wheel arch for the rear tire.

2. The vehicle body side structure according to claim 1, wherein an upper end of the outer wall portion is flush with a surface of the door panel.

3. The vehicle body side structure according to claim 2, wherein a lower end of the outer wall portion is flush with an outer side surface of a side sill of the vehicle body.

4. The vehicle body side structure according to claim 1, wherein the outlet portion is disposed at an outer end of the rear wheel arch in the vehicle width direction.

5. The vehicle body side structure according to claim 4, wherein the slit shape substantially vertically extends.

6. The vehicle body side structure according to claim 1, wherein the outlet portion includes an outlet opening directed to an outer side surface of the rear tire.

7. The vehicle body side structure according to claim 1, wherein the inlet portion includes an intake aperture, the intake aperture is disposed next to an outer side surface of the panel such that an inner side edge of the intake aperture in the vehicle width direction is flush with the outer side surface of the panel.

8. The vehicle body side structure according to claim 7, wherein the outer side surface of the panel includes a recess portion extending in a longitudinal direction of the vehicle body, and the intake aperture is aligned with the recess portion.

9. A vehicle comprising the vehicle body side structure according to claim 1.

10. A vehicle body side structure comprising: a flow redirecting member that introduces a traveling wind in a direction toward a rear wheel arch for a rear tire, wherein the flow redirecting member includes an inlet portion through which the traveling wind is introduced and an outlet portion through which air having been introduced through the inlet portion is ejected to a rear wheel arch side, wherein the inlet portion is positioned in front of the wheel arch, and wherein the outlet portion has a slit shape facing a surface of the rear tire on an outer side in a vehicle width direction, wherein the inlet portion is positioned in a panel in a vehicle body side part, wherein the flow redirecting member has a closed sectional shape formed by an inner wall portion disposed on an inner side in the vehicle width direction and an outer wall portion disposed on the outer side in the vehicle width direction, wherein a front end of the inner wall portion is flush with a surface of the panel, wherein the panel is a door panel, and the outlet portion is disposed at a rear end part of the door panel.

* * * * *